United States Patent [19]
Kullmann et al.

[11] Patent Number: 5,632,533
[45] Date of Patent: May 27, 1997

[54] BRAKE SYSTEM FAULT MODE GENERATOR

[75] Inventors: Bernhard W. Kullmann, Rochester Hills; Joerg Scheibel, Auburn Hills; Toki Nestorovski, Clinton Township, all of Mich.

[73] Assignee: ITT Corporation, N.Y.

[21] Appl. No.: 334,310

[22] Filed: Nov. 4, 1994

[51] Int. Cl.$^6$ .................................................. B60T 8/60
[52] U.S. Cl. .................. 303/122.05; 303/113.5; 303/122.08
[58] Field of Search .................. 303/122.02, 122.05, 303/122.08, 122.1, 113.5

[56] References Cited

U.S. PATENT DOCUMENTS

| | | |
|---|---|---|
| 3,767,272 | 10/1973 | Leiber ................... 303/122.1 |
| 4,320,506 | 3/1982 | Farazi et al. ................... 303/122.08 |
| 4,389,710 | 6/1983 | Rasmussen ................... 364/426.02 |
| 4,802,710 | 2/1989 | Burgdorf et al. ................... 303/122.05 |
| 4,837,552 | 6/1989 | Vandemotter et al. ................... 303/122.05 |
| 5,225,805 | 7/1993 | Cage et al. ................... 303/122.1 |

FOREIGN PATENT DOCUMENTS 4204735   2/1992   Germany .

OTHER PUBLICATIONS

"Failure Mode Testing Tool Set for Automotive Electronic Controllers" 8105 IEEE Transactions on Vehicular Technology; 43(1994) Feb., No. 1, New York, US.
ATZ Automobiltechnische Zeitschrift 96(1994)Januar, No. 1, Stuttgart, DE.
English Language Translation of Selected Portions of "The New BMW Simulaton Test Bench for Antilocing Brake Systems" Werner Foag, Eli. Pankiewicz, Carmen Roser, Werner Schmid and Heinz Troll, ATZ Automobiltechnische Zeitschrift—1994, Jan., No. 1.

*Primary Examiner*—Matthew C. Graham
*Attorney, Agent, or Firm*—Thomas N. Twomey; J. Gordon Lewis

[57] ABSTRACT

A fault controller for a brake system has a control display with a plurality of identifying labels displayed thereon which correspond to predetermined brake system fault options. A plurality of switches corresponding to the identifying labels and selectively setable to activate and deactivate conditions are on the control display. Fluid control valves are disposed along brake lines between the master cylinder and the wheel brakes. There are electrical connections between the switches and the fluid control valves wherein setting one of the switches to the activate condition activates a corresponding fault mode of the anti-lock brake system.

2 Claims, 2 Drawing Sheets

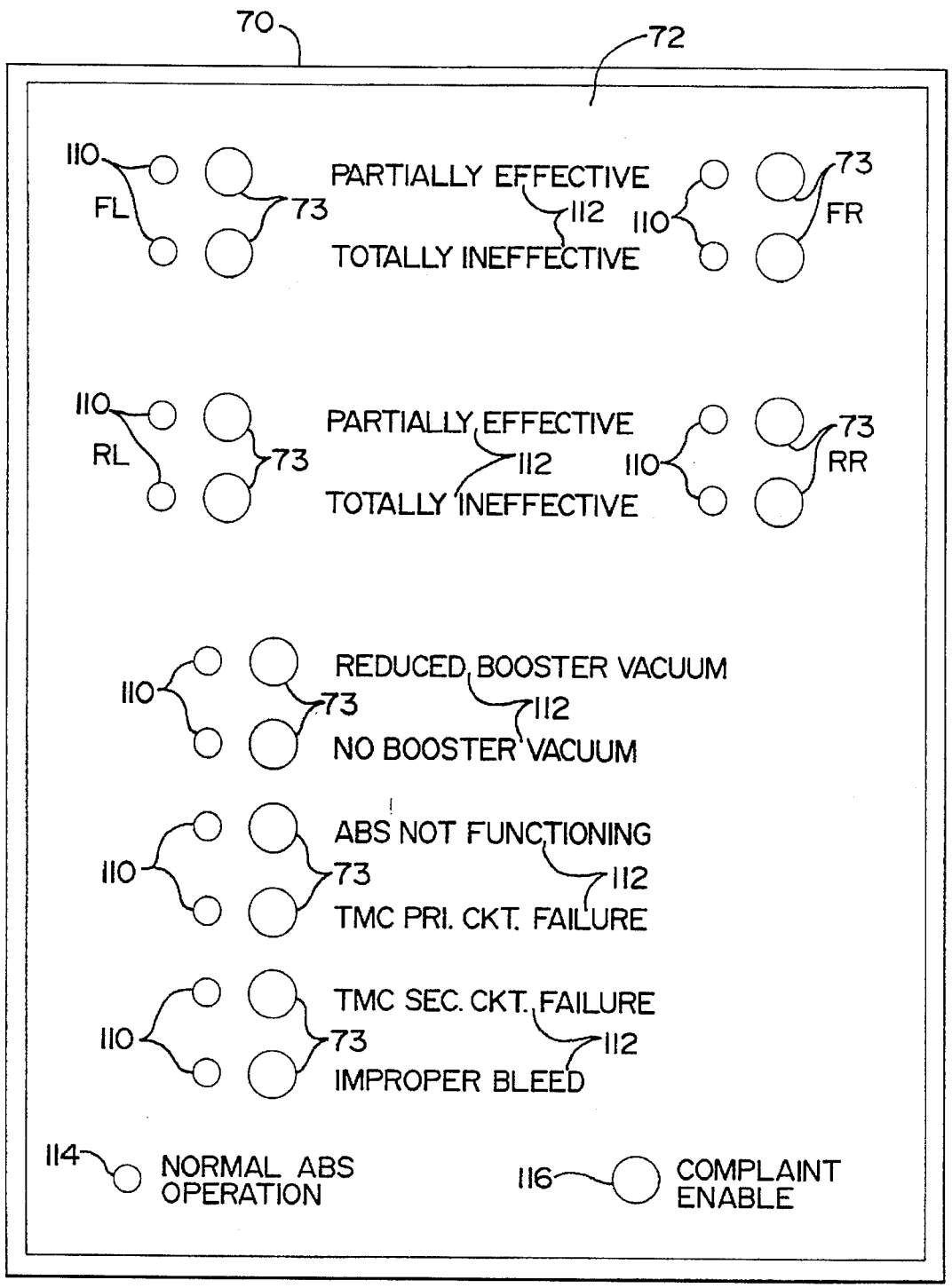

BRAKE SYSTEM FAULT MODE GENERATOR

FIELD OF THE INVENTION

This invention is directed to the field of brake systems, and more specifically to test and development equipment for use with brake systems.

BACKGROUND OF THE INVENTION

Modern brake systems, and particularly anti-lock brake systems, are highly sophisticated electro-mechanical control devices employed in motor vehicles. There is a need for engineers and technicians developing brake systems to understand all of the potential fault modes of the systems and the resultant effect on vehicle handling. Even engineers and technicians with a solid conceptual understanding of brake systems do not necessarily have an intuitive understanding of the effect experienced by a vehicle operator when one or more of the elements in the system does not function as expected.

It is desired to provide a device allowing the simulation of various fault conditions of brake systems, including anti-lock brake systems. Such faults include: a partially ineffective front brake, a totally inoperative front brake, a partially ineffective rear brake, a totally inoperative rear brake, both front brakes being partially effective, both front brakes being totally inoperative, both rear brakes being partially effective, both rear brakes being totally inoperative, reduced vacuum assisted booster, no vacuum assisted booster, anti-lock brake feature not functional, master cylinder primary circuit failure, master cylinder secondary circuit failure, and improper system bleed.

SUMMARY OF THE INVENTION

A fault controller for a brake system is disclosed comprising a control display having a plurality of identifying labels displayed thereon corresponding to predetermined brake system fault options. A plurality of switches corresponding to the identifying labels and selectively setable to activate and deactivate conditions are on the control display. Fluid control valves are disposed along brake lines between the master cylinder and the wheel brakes. There are electrical connections between the switches and fluid control valves wherein setting one of the switches to the activate condition activates a corresponding fault mode of the brake system. An enable switch on the controller, if included, must be set to an "enable" condition for the fault controller to affect brake operation.

A brake system is disclosed comprising a master cylinder selectively pressurized by a vehicle operator to apply vehicle wheel brakes. Brake lines extend between the master cylinder and the vehicle wheel brakes. A fault controller of the brake system is connected to an electrical power source and has a plurality of output terminals connecting with the fluid control valves, and a plurality of switches disposed between the electrical power source and the output terminals.

The present invention discloses a device for selectively simulating certain fault conditions within an brake system which is useful for the development of brake systems and the training of engineers and technicians working with both conventional hydraulic and anti-lock brake systems.

BRIEF DESCRIPTION OF THE FIGURES

FIG. 2 is a schematic diagram of a representative control display of the present invention.

DETAILED DESCRIPTION OF THE PREFERRED EMBODIMENT

Figure 1:
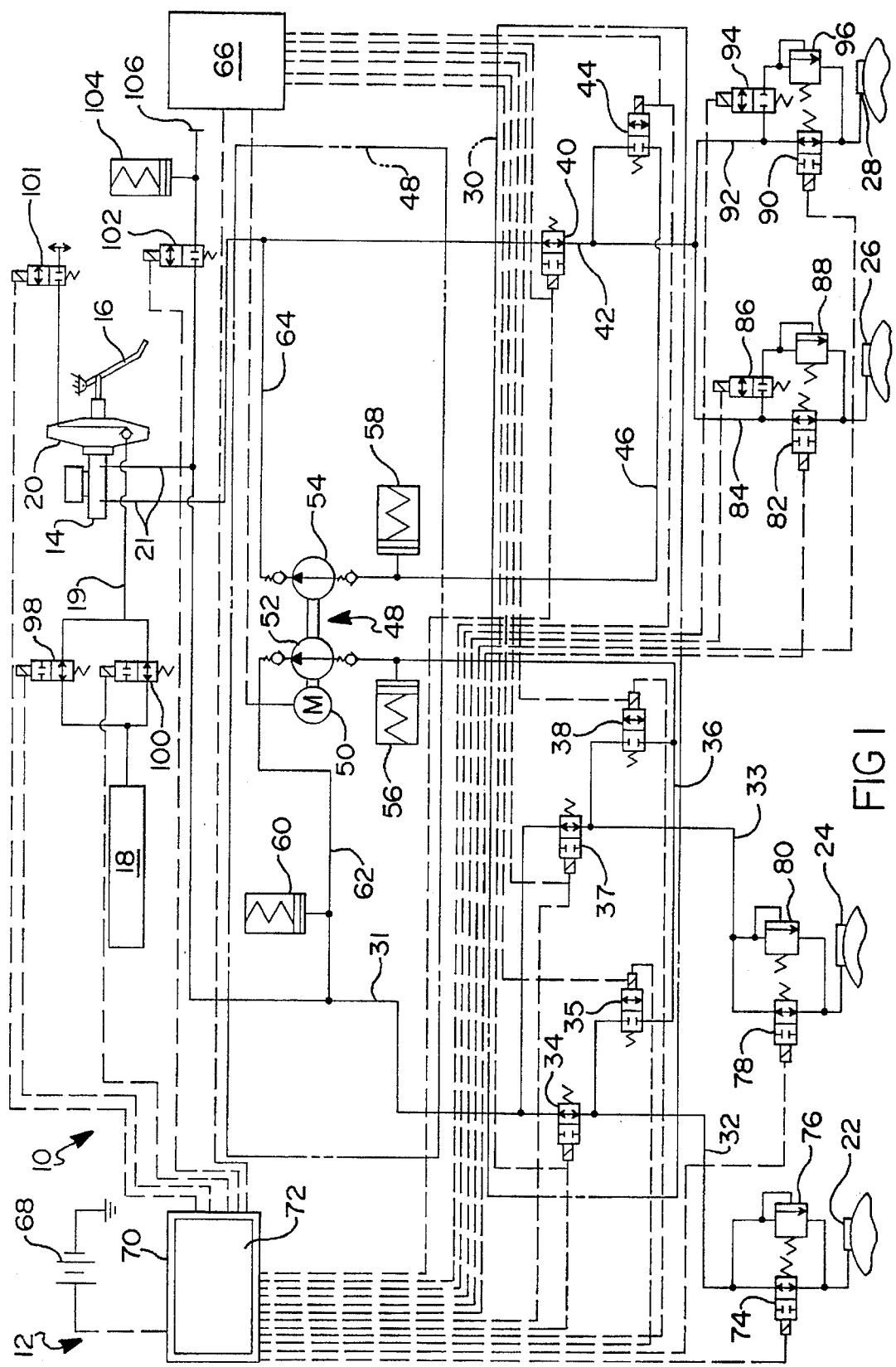
FIG. 1 is a schematic of a hydraulic power circuit for a vehicle brake system equipped with an anti-lock brake control system and a fault mode generator.

FIG. 1 shows a vehicle brake system 10 configured for anti-lock operation, or an anti-lock brake system. The anti-lock brake system 10 is supplemented by a fault generator 12 used to simulate brake system fault modes. The anti-lock brake system 10 includes both components common to conventional hydraulically actuated service brake systems and anti-locking components. The service brake system components include a tandem master cylinder 14 operated by a vehicle operator (not shown) selectively depressing a brake peddle 16. A vacuum source, such as an internal combustion engine intake manifold 18 of an engine operating at low or partial throttle, is connected by a pneumatic line 15 to a power booster 20. The power booster 20 uses the vacuum from the manifold 18 to pneumatically assist the operator applied pedal force in actuating the service brake. Hydraulic lines connect a rearward portion of the tandem master cylinder 14 with a primary hydraulic circuit including wheel brakes at the front left corner 22 and the front right corner 24. Hydraulic lines connect a forward portion of the tandem master cylinder 14 with a secondary hydraulic circuit including wheel brakes at the rear left corner 26 and the rear right corner 28. Alternatively, the primary and secondary circuits could provide a diagonally split hydraulic system instead of the front-to-rear split described above.

The anti-lock components of the system include a valve block 30 providing a plurality of hydraulic fluid control valves located along the hydraulic lines connecting the tandem master cylinder 14 with the wheel brakes 22, 24, 26 and 28. A front pressure line 31 extending from the rearward portion of the master cylinder 14 splits into left front and right front pressure lines 32 and 33 respectively within the block 30. A normally open front left inlet valve 34 is located on the left front pressure line 32, operably disposed between the tandem master cylinder 14 and the front left wheel brake 22. A normally closed front left exhaust valve 35 is teed-off the left front pressure line 31 between the front left inlet valve 34 and the wheel brake 22, connecting to a return line 36. A normally open front right inlet valve 37 is located on the right front pressure line 33, operably disposed between the tandem master cylinder 14 and the front right brake 24. A normally closed front right exhaust valve 38 is teed-off the right front pressure line 33 between the front right inlet valve 37 and the front right wheel brake 24, connecting to the return line 36.

A normally open rear inlet valve 40 of the valve block 30 is disposed along a rear pressure line 42 between the tandem master cylinder 14 and the rear wheel brakes 26 and 28. A normally closed rear exhaust valve 44 is teed-off the rear pressure line 42 between the inlet valve 40 and the rear wheel brakes 26 and 28, and connects to a rear return line 46.

The return lines 36 and 46 feed into a motor pump assembly 48. The motor pump assembly 48 has a motor 50 driving a first pumping unit 52 and a second pumping unit 54. The first pumping unit 52 is connected on an inlet side with the front return line 36. A first accumulator 56 of the motor pump assembly 48 is teed-off the front return line 36. The second pumping unit 54 is connected on an inlet side with the rear return line 46. A second accumulator 58 in the motor pump assembly 48 is teed-off a feed line into the inlet of the second pumping unit 54. A third accumulator 60 is teed-off an outlet line 62 from the first pumping unit 52. The outlet line 62 connects to the front pressure line 31. An outlet line 64 from the second pumping unit 54 connects with the rear pressure line 42.

An electronic control unit 66, or ECU, for the anti-lock elements is electrically connected with the motor 50, and each of the inlet valves 34, 37 and 40 and each of the exhaust valves 35, 38 and 44. The ECU 66 is also connected to a power source such as a 12 volt battery 68. The ECU 66 emits control signals along electrical conductors to the inlet valves and exhaust valves. The ECU 66 monitors a plurality of system parameters, such as wheel rotational velocity, and emits signals to the valves dependent upon those parameters.

The fault mode generator 12 substantially comprises a fault controller 70 with a display panel 72 having a plurality of toggle switches 73 and a plurality of electrically responsive anti-control valves electrically connected with the fault controller 70. The switches 73 are toggled between activate and deactive positions. The fault controller 70 is electrically connected with a power source, such as the 12 volt battery 68. The plurality of valves to which the fault controller 70 is connected include the inlet valves 34, 37, and 40, and exhaust valves 35, 38 and 44.

Supplemental fluid control valves, referred to here as fault control valves, in the brake system 10 are also electrically connected to the fault controller 70. A normally open front left fault control valve 74 is disposed in the left front pressure line 32 between the front left wheel brake 22 and the front left exhaust valve 35. A front left proportioning valve 76 is disposed in parallel with the front left fault control valve 74. A normally open front right fault control valve 78 is disposed in the front right pressure line 33 between the front right wheel brake 24 and the front right exhaust valve 38. A right front proportioning valve 80 is disposed in parallel with the front right fault control valve 78.

A normally open rear left fault control valve 82 is disposed in a left rear pressure line 84 between the rear left wheel brake 26 and the rear pressure line 42. A normally closed rear left fault control valve 86 and a rear left proportioning valve 88 are in series, parallel to the left fault control valve 82. The proportioning valve 88 is the closer of the two valves 86 and 88 to the left rear wheel brake 26.

A normally open rear right fault control valve 90 is disposed in a right rear pressure line 92 between a rear right wheel brake 28 and the rear pressure line 42. A normally closed rear right fault control valve 94 and a rear right proportioning valve 96, in series, parallel the normally open rear right fault control valve 90. The rear right proportioning valve 96 is disposed more proximate to the right rear wheel brake 28 than is the fault control valve 94.

In the vacuum assist portion of the brake system, the pneumatic line 19 between the engine manifold 18 and the power booster 20 is interrupted by first and second vacuum valves 98 and 100 respectively in parallel with each other. The vacuum valves 98 and 100 are both normally open valves. A third vacuum valve 101 is normally closed and is disposed between the power booster 20 and ambient atmosphere.

A normally closed bad bleed simulator valve 102 is connected to the front pressure line 31 proximate to the master cylinder 14. A bad bleed simulator accumulator 104 is disposed in series with the valve 102 between the valve 102 and a tube end 106.

Each of the plurality of toggle switches 73 of the display panel 72 has an associated LED 110 adjacent thereto. An LED 110 is associated with each of the switches. The associated LED 110 is illuminated when a switch 73 is in the activate position. Each of the switches 73 has an identifying label adjacent to it. The identifying label is descriptive of the fault mode produced by moving the switch to the activate position. There are fourteen individual toggle switches 73 on the display panel 72 which individually and cooperatively provide a total of 18 different fault modes. The 14 switches 73 have the following labels: Front Left Partially Effective, Front Right Partially Effective, Front Left Totally Ineffective, Front Right Totally Ineffective, Rear Left Partially Effective, Rear Right Partially Effective, Rear Left Totally Ineffective, Rear Right Totally Ineffective, Reduced Booster Vacuum, No Booster Vacuum, ABS Not Functioning, Tandem Master Cylinder Primary Circuit Failure, Tandem Master Cylinder Secondary Circuit Failure, and Improper Bleed.

Two signal lamps are provided at a bottom of the panel. Illumination of a Normal Anti-lock Brake System (ABS) lamps 114 indicates normal ABS operation. A Complaint Enable Lamp/Switch 116 is also located at the bottom of the display panel 72. The switch 116 is in the form of an illuminated push button. When in an enable mode, the button is illuminated and toggle switches are able to actuate their respective fault modes. When not in an enable mode, the button is not illuminated and toggling of the switches 73 has no effect.

The invention operates in the following manner. Depression of the brake peddle 16 by a vehicle operator causes fluid in the tandem master cylinder to be pressurized. The power booster 20 exploits the vacuum of the intake manifold 18 through a connecting line 19 to provide an assist to the operator in pressurizing fluid in the tandem master cylinder 14. In a brake apply in which the Complaint Enable Switch 116 is not in the enable position, and/or none of the fault modes are elected, and in which the ECU 66 does not cause any of the anti-lock brake system valves 34, 35, 37, 38, 40, or 44 to be activated, fluid in the front pressure line 31 and rear pressure line 42 is pressurized, with the pressure being communicated to all four wheel brakes 22, 24, 26 and 28.

If the ECU 66 detects one of the front right, front left, or the rear wheels rotating at a low rate of speed relative to the others, it will intermittently interrupt pressure to the slower wheel or wheels to prevent lock up by intermittently actuating the valves associated with that wheel. For example, to prevent rear wheel lock up, valves 40 and 44 are intermittently cycled, thereby alternately applying and releasing the rear brakes.

The fault mode generator 12 is used to duplicate the effect of a failure of one or more of the system components to operate as expected. The eighteen possible fault modes which can be generated with the fault mode generator are described below. However, before any of the fault modes can be induced, the Complaint Enable Switch must be in the enable condition. The illumination of the switch 116 serves as a warning that any of the fault modes elected with the switches 73 will be enabled or activated.

The switch 73 labeled "Front Left Partially Effective" energizes valve 74 in an activate position, directing it to the closed position, thereby inducing a second fault mode. Pressurized fluid in the front left pressure line 32 is then forced to pass through the proportioning valve 76, thereby providing reduced braking effectiveness. Similarly, to provide reduced braking effectiveness at the front right wheel brake, the switch labeled "Front Right Partially Effective" is toggled to the activate position to close the valve 78 and force fluid flow through the proportioning valve 80.

A third fault mode of a totally ineffective front left brake is achieved by toggling the switch labeled "Front Left Totally Ineffective." When toggled to the activate position, this switch energizes valve 34 to prevent the front left wheel brake 22 from being activated. Similarly, the fourth fault mode is realized when the switch labeled "Front Right Totally Ineffective" is toggled to the activate position, it energizes valve 37, preventing actuation of front right wheel brake 24.

The fifth fault mode, a partially ineffective rear left brake, is achieved by toggling to the activate position the switch labeled "Rear Left Partially Effective." When this is done, both valves 82 and 86 are energized, enabling pressurized fluid to reach the rear left brake 26 only through the proportioning valve 88, thereby providing the desired partially effective brake actuation. Similarly, the sixth fault mode, partially effective right rear brake performance, is achieved by toggling the switch labeled "Rear Right Partially Effective" to the activate position, thereby energizing valves 90 and 94. Fluid must pass through the proportioning valve 96, thereby reducing the effectiveness of the right rear brake.

The seventh fault mode, a totally ineffective rear left brake is achieved by toggling the switch labeled "Rear Left Totally Ineffective" to the activate position. This energizes only valve 82, closing the valve and preventing the rear left brake from being actuated. Similarly, an eighth fault mode, a totally ineffective right rear brake, is achieved by toggling the "Right Rear Totally Ineffective" switch to the activate position. This energizes the valve 90, preventing the actuation of the right rear brake.

In a ninth fault mode, both the front brakes 22 and 24 are rendered partially effective by energizing valves 74 and 78 by toggling both of the "Front Partially Effective" switches to the activate position simultaneously. In a tenth fault mode, both front brakes are rendered totally inoperative by switching the "Front Totally Ineffective" switches to the activate position, thereby energizing valves 34 and 37.

An eleventh fault mode is established by switching both the switches labeled "Rear Left Totally Ineffective" and "rear right totally ineffective" to the activate positions, thereby energizing and closing valves 82 and 90. Alternatively, a separate switch can be provided which would simultaneously disable rear brakes by energizing valve 40 to prevent actuation of the rear brakes.

A twelfth fault mode is to have partially effective rear brakes. This is achieved by toggling both the "Rear Left Partially Effective" switch and the "Rear Right Partially Effective" switch to the activate position, thereby energizing valves 82, 84, 90 and 94. Fluid is forced through proportioning valves 88 and 96, reducing the effectiveness of the rear brakes.

A thirteenth fault mode is characterized by reduced vacuum assist. This is achieved by toggling the switch labeled "Reduced Booster Vacuum" to the activate position which energizes valve 102, thereby venting the booster 20 to atmosphere. A system with no vacuum assist is characteristic of a fourteenth fault mode. This fault mode is achieved by toggling the switch labeled "No Booster Vacuum" to the activate position. This energizes valves 98, 100 and 101, blocking vacuum communication between the manifold 18 and the booster 20 while simultaneously opening the booster 20 to atmosphere, thereby relieving any residual vacuum therein.

The fifteenth fault mode, ABS not functioning, is characterized by the valves controlling wheel lock up 34, 35, 37, 38, 40 and 44 not being activated. This is accomplished by toggling the "ABS Not Functioning" switch to the activate position which interrupts current flow to the ECU 66, thereby disabling the ABS feature.

A sixteenth fault mode is duplication of a tandem master cylinder primary circuit failure. To do this, the switch labeled "TMC Primary Circuit Failure" is toggled to the activate position. This energizes valves 35, 38 and 102. When energized, each of the these valves is cycled to an open or exhaust position, allowing fluid to circulate without developing brake apply pressure, thereby simulating a leak in a fluid line or some similar hydraulic system failure. Similarly, a seventeenth fault mode, second circuit failure, is simulated by toggling the switch labeled "TMC Secondary Circuit Failure" to the activate position. This causes valve 44 to be energized, preventing the build up of pressure at the rear wheel brakes 26 and 28, just as when there is a secondary circuit failure.

An eighteenth fault mode simulated by the fault mode generator 10 is an improper system bleed. The switch labeled "Improper Bleed" is toggled to the activate position, which energizes valve 102. With the energized valve 102 in the open position, fluid can communicate with the accumulator 104 to provide the squishy peddle feel characteristic of an improper bleed.

The fault mode activating switches here are provided by simple toggle switches 73 movable between open and closed positions which can alternatively correspond to the activate and deactivate conditions. The switches can alternatively be provided by any known switching or relay device. Alternative display devices could be used as well. One example of an alternative display is a CRT screen. The CRT may be combined with an alternative to the toggle switches such as a touch screen for choosing the desired fault modes.

Although the fault mode generator 12 is shown here with an anti-lock brake system, it should be readily apparent that is could be alternatively employed with a conventional hydraulically actuated brake system.

The preceding detailed description of the invention is not intended as a limitation of the invention, but is merely one of many possible embodiments of the invention. The true scope of the invention can be best understood by studying the appended claims.

We claim:

1. A fault mode generator for a brake system having a master cylinder, wheel brakes and brake lines providing fluid communication between wheel brakes and the master cylinder, the fault mode generator comprising:

a fault controller connected to an electrical power source and having a plurality of output terminals and a plurality of operator selectable switches operably disposed between the electrical power source and the output terminals;

a plurality of electrically responsive fluid control valves directly electrically connected to the switches of the fault controller for direct control thereby and operably disposed in the brake lines between the master cylinder and the wheels brakes wherein the brake system includes an anti-lock brake system controller electrically connected to the fluid control valves;

a plurality of electrically responsive fault control valves electrically connected to the fault controller and operably disposed in the brake lines between the fluid control valves and the wheel brakes; and a plurality of proportioning valves fluidly in parallel with the fault control valves and adapted to simulate a decreased coefficient of friction at a selected wheel brake when the fault control valve associated with the selected wheel brake is closed.

2. A brake system comprising:

a master cylinder selectively pressurized by a vehicle operator;

a plurality of vehicle wheel brakes;

a plurality of brake lines fluidly connecting the master cylinder with the vehicle wheel brakes;

a plurality of electrically responsive fluid control valves disposed in the brake lines;

a fault controller connected to an electrical power source and having a plurality of output terminals connected to the fluid control valves, and a plurality of operator selectable switches disposed between the electrical power source and the output terminals wherein the brake system includes an anti-lock brake system controller electrically connected to the fluid control valves further comprising a plurality of electrically responsive fault control valves directly electrically connected to the fault controller and operably disposed in the brake lines between the fluid control valves and the wheel brakes; and a plurality of proportioning valves fluidly in parallel with the fault control valves and adapted to simulate a decreased coefficient of brake friction at a selected wheel brake when the fault control valve associated with the selected wheel brake is closed.

* * * * *